F. S. KAY.
TOOL FOR REMOVING CONNECTORS FROM BATTERIES.
APPLICATION FILED JULY 6, 1918.
1,316,485. Patented Sept. 16, 1919.
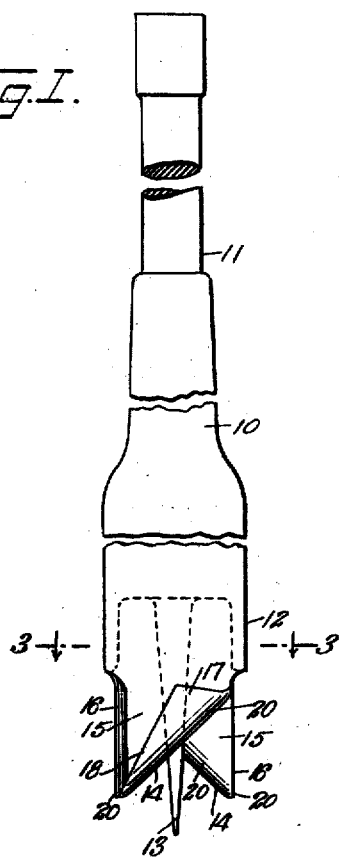
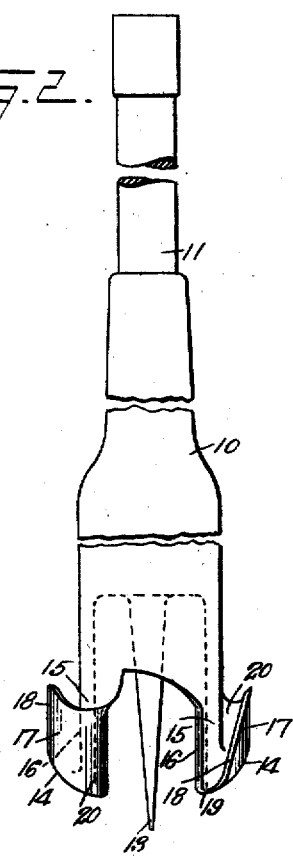
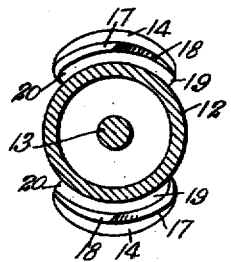
WITNESSES
H. J. Walker
INVENTOR
Fremont S. Kay
BY
ATTORNEYS

UNITED STATES PATENT OFFICE.

FREMONT S. KAY, OF MORLAND, KANSAS.

TOOL FOR REMOVING CONNECTORS FROM BATTERIES.

1,316,485.  Specification of Letters Patent.  Patented Sept. 16, 1919.

Application filed July 6, 1918. Serial No. 243,541.

*To all whom it may concern:*

Be it known that I, FREMONT S. KAY, a citizen of the United States, and a resident of Morland, in the county of Graham and State of Kansas, have invented a new and Improved Tool for Removing Connectors from Batteries, of which the following is a description.

The prime object of my invention is to provide a tool whereby connecting strips of storage batteries may be removed from the posts of the groups of plates in such manner as not to destroy the posts and to accomplish the removal of the connecting strips without injuring the latter so that in repairing the battery the same connecting strips may be replaced on the original posts and secured thereto in the usual manner.

Reference is to be had to the accompanying drawings.

Figure 1 is a side elevation of a tool embodying my invention;

Fig. 2 is an elevation, the view being taken at right angles to Fig. 1;

Fig. 3 is a sectional plan view on the line 3—3. Fig. 1.

In forming my improved tool a head 10 is formed on a shank 11, the latter being adapted to be secured in a brace or the like after the manner of an auger. The front end 12 of the head 10 is made tubular and projecting from the head at the center of the tubular end 12 is a tapered pin 13 rigid with the head. Said pin is adapted to be placed against the post of a storage battery centrally of the end of the post to be driven into the latter to center the tool and to steady the same.

On the head at the front and disposed about the pin 13 are cutters so formed as to cut away the soldering employed in the eye of the connecting strip about the post of a group of plates. In the example shown two cutting units designated generally by the numeral 14 are disposed diametrically opposite. Each cutting unit includes a forwardly projecting cutter 15 extending from the front edge of the tubular end 12 in the plane of the latter, the forward edge 16 constituting a cutting edge and preferably ranging parallel with the axis of the tool. Integral with the cutting element 15 is a wing 17 laterally outward from the said element 15 and united to the latter by a web 20. The wing 17 constitutes a second cutter, its front edge 18 being a cutting edge. The front edge 19 of the web 20 is sharpened to constitute a cutting edge at the angle of the cutting edges 16, 18. The web 20 is curved in cross section and said web rises on an incline from the cutting angle 19, to thereby form with the cutter 15 and wing 17 a guide for the chips. In using the tool the same having been inserted in a brace or like turning means, the point of the tapered pin 13 is entered into the post of the group of plates, said post being of lead, or more or less soft metal. When the tool is now turned about its axis and advanced, the pin 13 is forced forwardly in the post and the cutting units will effectively cut away the solder uniting the eye of the connecting strip to the post without destroying either the post or strip, leaving the two available for use for repairing the battery to thereby restore the same substantially in its original form as it left the factory. The cutter 15 of each unit is slightly in advance of the second cutter 17 of the unit and thus the unit makes in sequence two cuts in concentric zones. The inner cutters 15 of the tool clear the solder from the peripheral surface of the post of the battery while the outer cutters 17 clear the solder from the wall of the eye on the connecting strip. The chips produced by the cutting unit escape through the guide formed between the two cutters outside of the cylindrical surface of the head 10.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A tool for use in removing the connecting strip from storage batteries, said tool including a shank and a head, said head having a tubular chamber in its front end, a rigid tapering pin on said head within the tubular chamber and coaxial therewith, and cutting units on the head, each unit presenting one cutter coincident with the wall of the said chamber, together with a wing laterally spaced outwardly from the first cutter and constituting a second cutter, the cutting edge of which setting back from the cutting edge of the first cutter and presenting an upwardly and rearwardly inclined cutting edge, and a web uniting the said cutters and forming therewith a chip guide and discharge between the said cutters, there being a cutting edge on the front end at its junction with the first and second cutters.

2. A tool as herein characterized and comprising a shank and a head thereon, said head having a tubular chamber in its free end adapted to receive and accommodate a storage battery post, centering means carried by said chambered head, and cutting units on said chambered head, each unit including an inner cutter having a vertical cutting edge and on the tubular end in position to operate over the periphery of the post to cut the solder therefrom, and an outer cutter spaced laterally from the inner cutter and concentric therewith whereby to cut in a path concentric with that of the inner cutter the solder from the eye of the connection of a storage battery, said outer cutter having an inclined cutting edge, and an upwardly and rearwardly extending and guiding web connecting the said inner and outer cutters.

FREMONT S. KAY.